April 25, 1967 J. SENIUTA 3,315,710
MACHINE FOR MAKING LOOPING POINTS
Filed May 25, 1964 4 Sheets-Sheet 1

Inventor:
John Seniuta
By Hofgren, Wegner,
Allen, Stellman & McCord Attys

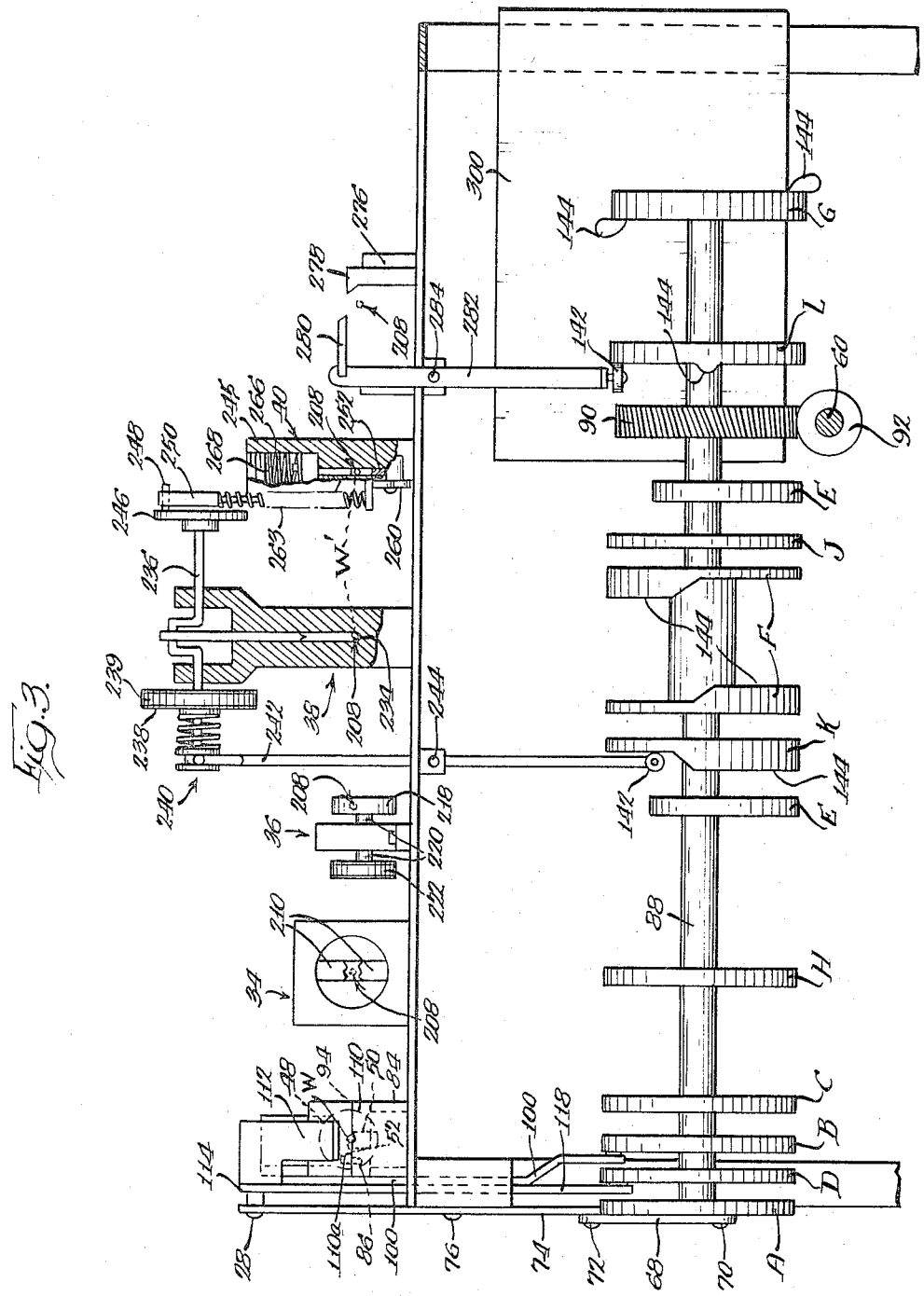

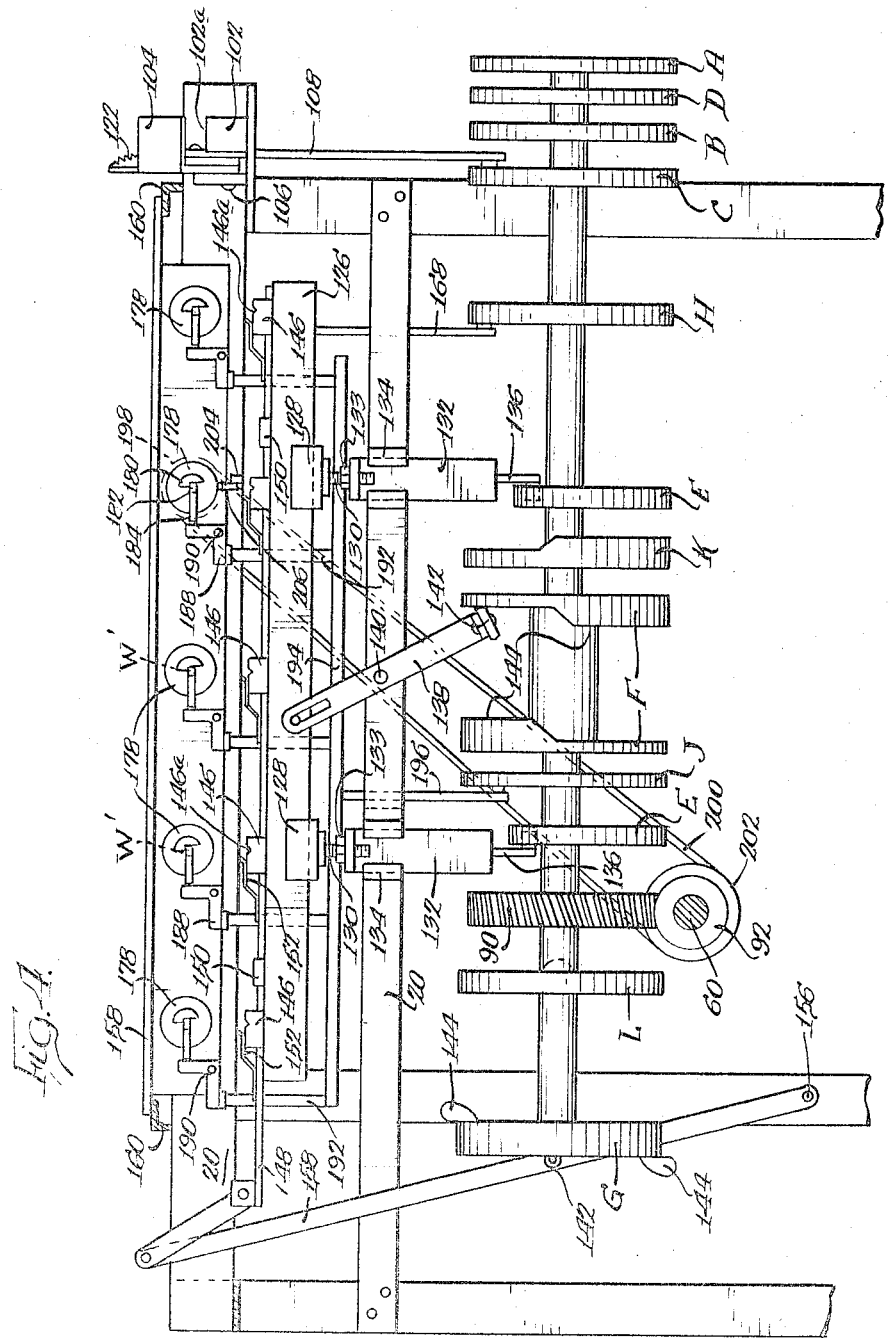

United States Patent Office 3,315,710
Patented Apr. 25, 1967

3,315,710
MACHINE FOR MAKING LOOPING POINTS
John Senjuta, 630 Waveland Ave.,
Chicago, Ill. 60613
Filed May 25, 1964, Ser. No. 370,024
17 Claims. (Cl. 140—1)

This invention relates to a system for making looping points or the like, such as those looping points useful in the manufacture of stockings, sweaters and the like. More particularly, the invention relates to a system which receives wire during a generally continuous operation and processes the wire as a workpiece through a plurality of working stations to form looping points therefrom.

A general object is to provide a new and useful system for making looping points of the character described.

Another object is to provide a machine capable of automatic and continuous operation for producing looping points from wire.

In one form of the invention, a machine is provided which receives a strand of wire, straightens the wire, cuts the wire to a predetermined length and processes the resulting wire segment through a plurality of working zones for swaging, grinding, stamping and bending the wire to the form of a looping point and then delivers the looping point product by cutting the formed portion of the wire from the remainder of the wire segment. It is also an object to provide a new and useful system capable of any one or more of such operations.

Still another object is to provide a new and useful die device for bending a wire segment to looping point configuration.

Yet another object is to provide a new and useful stamping system including a plunger device for grooving a wire segment during the manufacture of looping points and a drive system for the plunger device which may also drive a bending die.

And another object is to provide a new and useful system operating on an automatic timed cycle for forming looping points from wire.

It is also an object of this invention to provide a system in accordance with any of the foregoing objects wherein the product looping points are recovered separate from waste wire material.

A further object is to provide a new and useful device for holding a wire as a workpiece, especially where it is desired to rotate the wire on the axis of the wire during working.

Other objects will be apparent from the following description and from the drawings in which:

FIGURE 3 is a section and view along line 3—3 of FIGURE 1;

FIGURE 4 is a section and view along line 4—4 of FIGURE 1;

Figure 2:
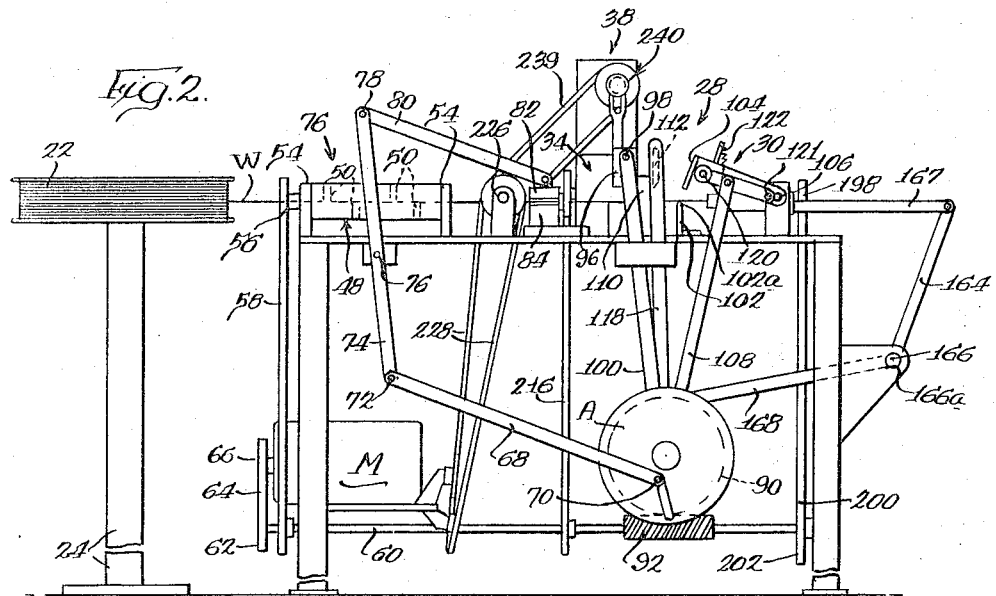
FIGURE 2 is an end view taken from the left end of the device as illustrated in FIGURE 1.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

Figure 1:
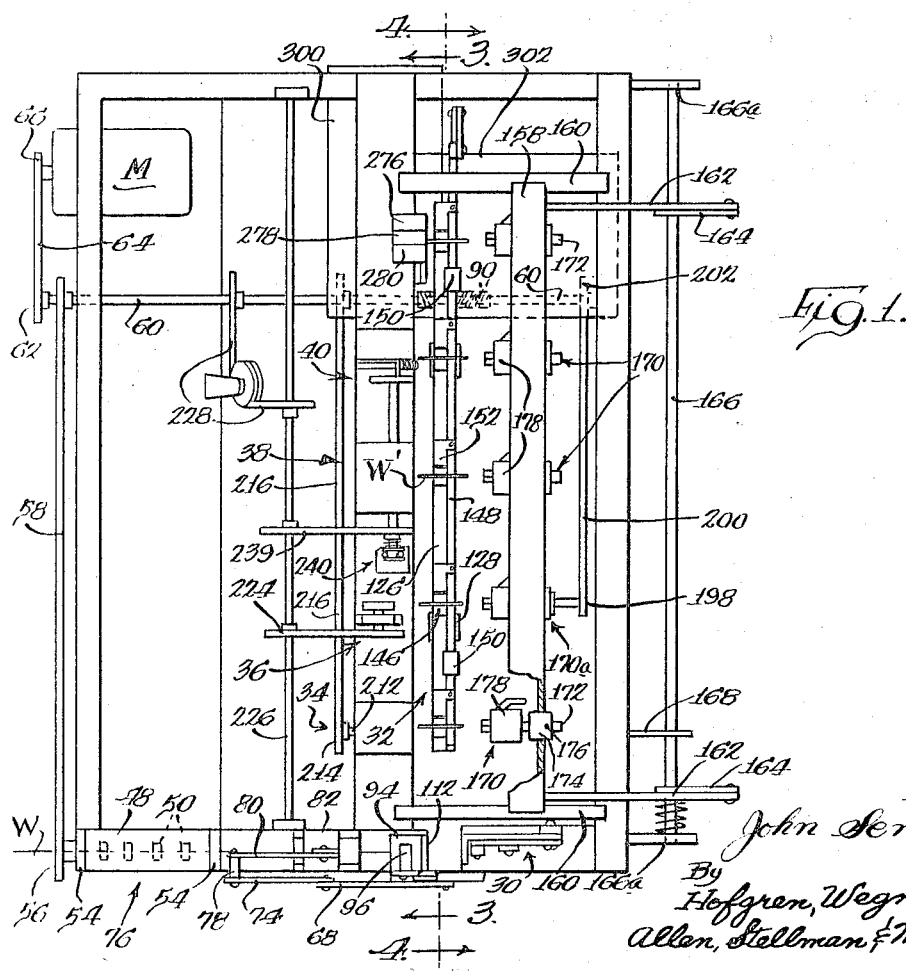
FIGURE 1 is a a plan view of a form of device embodying the present invention.

Referring first to FIGURES 1–3, the form of machine illustrated includes a frame 20 having a plurality of wire receiving and working zones supported thereon. A wire supply reel 22 is rotatably mounted on a support 24 for supplying a strand of stainless steel wire W to the machine mounted on frame 20. The stainless steel wire is of the gauge desired for the looping point to be manufactured therefrom, e.g. from 0.01 to 0.05 inch. The wire is usually stiff and is fed to the system mounted on frame 20 first through a wire straightening station 26 for straightening the wire. The wire is directed from straightening station 26 to a wire cutting station 28 for cutting the wire to the proper length, e.g. as a wire segment W', for processing by the device. As the wire is cut to length, a wire end bend forming station 30 provides a hook or bend at one end of the wire segment W'; the hook or bend will be used by a transfer system in transferring the wire from station to station to maintain proper orientation of the wire as a workpiece relative to tools working on the wire at various working stations. The system for transferring the wire from station to station is shown generally at reference numeral 32.

The stations to which the wire transfer system 32 transfers the wire are, seriatim, swaging station 34, grinding station 36, grooving station 38, bending station 40 and cutting station 42. In swaging station 34, the end of the wire is swaged or pounded to a taper while leaving a blunt wire end beyond the taper. The blunt wire end is ground to a rounded ball-point surface at grinding station 36; the wire is longitudinally grooved at station 38 and is bent to looping point configuration at bending station 40 with the groove oriented along the back of the looping point. The looping point portion of the wire is then cut from the remainder of the wire in cutting station 42.

Figure 8:
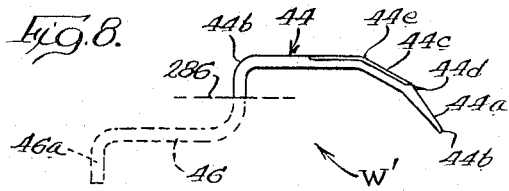
FIGURE 8 is an illustration of a looping point of the type which can be manufactured using the device of FIGURE 1.

Referring briefly to FIGURE 8, a looping point is illustrated at reference numeral 44 with the remainder of the wire segment W' shown in phantom at 46 after cutting of the looping point 44 from the remainder 46. It will be noted that the looping point includes the tapered or pounded surface 44a formed at station 34, the ball-point 44b formed at statoin 36, the longitudinal groove 44c formed at station 38 and the bends 44d, 44e and 44f formed at station 40. The remainder 46 of wire segment W' includes the hook or bend 46a formed at station 30.

Wire straightening station 26 includes a wire straightener comprising a hollow tubular member 48 having a plurality of wire holding posts 50 with bifurcated wire receiving ends 52. Ends 52 straddle the axis of tubular member 48 and are configurated to urge the wire piece therethrough into coaxial alignment with such axis to straighten the wire as tubular member 48 is rotated carrying the posts 50.

Tubular member 48 is rotatably mounted by bearings 54 to suitable framework and is driven by pulley 56 through belt 58 from a shaft 60. Shaft 60, in turn, has mounted thereon a pulley 62 which is driven by belt 64 from pulley 66 on the shaft of motor M.

A wire feeding mechanism is provided for pulling the wire through the straightening station 26 and for pushing the straightened wire toward the cutting and forming stations 28 and 30. Accordingly, a driven cam A is connected to a link 68 at an eccentric pivot point 70 on cam A. The other end of link 68 is pivotally connected at 72 to an arm 74 pivotally mounted to frame 20 by pin 76. The other end of arm 74 is pivotally connected at 78 to a rod 80 which is in turn pivotally connected to a wire engaging pusher block member 82. Block 82 rests on the straightened wire W which is in turn supported by a sliding block 84. Cam A turns one revolution during each cycle of the machine and feeds a length of wire by pivoting arm 74 through link 68 in a clockwise direction to push block 84 to the right as viewed in FIGURE 2. Since rod 80 is pivotally mounted to arm 74 above block 82, rod 80 also exerts a downward force while pushing to clamp wire W between blocks 82 and 84 so that block 84 is carried with block 82. A downward projecting flange 86 is provided on the front edge of block 82 for engaging block 84 during the return stroke to return block 84 with block 82 as cam A completes a full revolution. During the return of block 82, rod 80 pulls slightly upward so that clamping of wire W between blocks 82 and 84 is relieved and blocks 82 and 84 slide relative to stiff wire W. The pivot point 70 on cam A may be adjusted radially outward to increase the wire feeding stroke or inward to decrease the wire feeding stroke to provide the desired length of wire to be fed to the device for cutting into the desired length of segment W′.

Cam A and the remaining cams B–L, to be described hereinbelow, are mounted for rotation with a cam shaft 88. Cam shaft 88 has secured thereto a worm wheel 90 which is driven by a worm 92 on shaft 60 to drive wheel 90 and shaft 88 one revolution per cycle of operation of the machine. Thus, shaft 88 rotates very slowly relative to shaft 60.

At the wire cutting station 28, wire W is received in a first clamp and supported therein on an anvil 94. After the wire feed stroke is complete, a hammer 96, pivotally mounted at 98, is driven downward by a cam follower rod 100 operated by cam B. Hammer 96 strikes the wire on anvil 94 and holds the wire. Similarly, the wire is held by a second clamp, spaced from the first clamp, comprising an anvil 102 on which the wire is received. A hammer 104, pivotally mounted at 106, is driven downward by cam follower 108 controlled by cam C, at the same time hammer 96 is driven downward.

Between the two clamps, a cutter system is provided including a support 110 receiving the wire between anvils 94 and 102. A blade 112 of the cutter is secured to an arm 114 which is pivotally mounted at 116. Cam follower rod 118 is pivotally mounted at one end to an arm 114 and is controlled by its other end by a cam D for pulling arm 114 downward at the same time hammers 96 and 104 are pulled downward. Blade 112, during downward movement, cooperates with the leading edge 110a of support 110 to cut a length or segment W′ from wire W.

A hammer 120 is pivotally mounted to hammer 104 at 121, and a tension spring 122 is provided between hammers 120 and 104 for normaly maintaining the head of hammer 120 above the head of hammer 104. As hammer 104 is pulled downward, hammer 120 travels therewith. Hammer 104 is stopped by the wire on anvil 102, but hammer 120 continues its downward movement extending spring 122 and gauging the wire W beyond edge 102a of anvil 102 to form a downward hook or bend 46a in the wire segment W′ as the wire segment W′ is cut by blade 112 from the wire W. Spring 122 returns hammer 120, and cams B, C and D return hammers 96 and 104 and blade 112 leaving the length of wire W′ resting on anvils 94 and 102 and support 110. As will be seen, the wire segment W′ is also held by a holder on a transfer bar 126 as the hammers and blade are returned upward.

Referring now to FIGURE 1 and also to FIGURE 4, a transfer system is provided for transferring the cut wire segments from the cutting and bend-forming station to the remaining working stations. The transfer system includes a transfer bar 126 which is slidably supported in channel brackets 128, in turn supported by posts 130 having threaded ends received in a threaded socket of a leg 132. An adjusting nut 133 is provided for adjusting the height of transfer bar 126 from legs 132 or for leveling the transfer bar 126.

Each leg 132 is vertically, slidably received in a bracket 134 secured to frame 20. The lower end of each leg 132 is secured to and supported by a follower 136, each follower 136 being actuated to slide legs 132 upward and downward by one of a pair of identical cams E.

In order to slide transfer bar 126 longitudinally in channel brackets 128, an arm 138 is pivotally connected to transfer bar 126 at one end and is pivotally connected between its ends at 140 to frame 20. The lower end of arm 138 carries an impact lug 142 which is received within the bifurcation within a bifurcated cam F. In FIGURE 1, the transfer bar 126 is illustrated in full lines in its position farthest to the right with lug 142 in association with the left inner wall of cam F. Each inner wall of cam F includes a spaced rise or lug 144, which upon rotation of cam F, strikes impact lug 142. With the transfer bar in the position shown in full lines in FIGURE 1, the lug 144 on the left wall of cam F, upon striking impact lug 142, will pivot arm 138 counterclockwise about point 140 to slide transfer bar 126 to the left. When it is desired to return transfer bar 126 to the right, a lug 144 on the right inner wall of cam F will strike lug 142.

Secured to the top surface of transfer bar 126 are a plurality of blocks 146, each having a groove 146a transverse to transfer bar 126. Grooves 146a are spaced an equal distance from each other along transfer bar 126. A locking bar 148 is slidably mounted in brackets 150 on transfer bar 126 and carries a plurality of leaf springs 152, one for each block 146. Leaf springs 152 are properly spaced on locking bar 148 so that sliding of locking bar 148 to the left, as viewed in FIGURE 1, positions each leaf spring 152 over a separate groove 146a for holding a wire segment W′ in the groove 146a, while return of bar 148 to the right removes springs 152 from grooves 146a to release the wire segments. Thus, the leaf springs 152 form holders in combination with blocks 146 and grooves 146a.

In order to move the locking bar 148 to locking and release positions, an arm 154 is pivotally mounted at one end of locking bar 148 and depends downward therefrom to a pivotal mounting 156 at the bottom of frame 20. Intermediate pivot 156 and locking bar 148 an impact lug 142 is secured to arm 154 in alignment with a rise 144 on a cam G. In the form of device shown, it is desired to move locking bar 148 to unlocking position only when transfer bar 126 is shifted to the right, as viewed in FIGURE 1, and to move locking bar 148 to locking position only when transfer bar 146 is to the left. During movement of transfer bar 146 between right and left, the impact lug 142 on arm 154 will become lined with separate rises 144 on opposing outer faces of the cam G so that the rise 144 on the left face of cam G will strike the impact lug 142 on arm 154 for locking the holders while the rise 144 on the right-hand face of cam G will similarly control the unlocking function.

Returning now to the wire cutting station 28 and forming station 30, seen in FIGURES 1–3, immediately before the wire segment W′ is cut to length and the bend is formed in one end thereof, transfer bar 126 is in its left position, and has received wire W in the groove 146a of the first block 146 and leaf springs 152 have been moved to hold the wire. Thus, when the hammers and cutting blades are driven upward by cams B, C and D, the wire is held in the groove 146a. The transfer bar 126 may then be driven to the right to dispose the wire in alignment with the swaging station 34.

For receiving wires transferred by the transfer system and for carrying the wires to the aligned working stations 34, 36, 38, 40 and 42, for performing the desired operations on the wire segment W′, a carrier system is provided. The carrier system includes an angle beam 158 which is slidable on surface 160 of frame 20 toward and away from the aligned working stations. A pair of arms 62, one at each end of beam 158, are pivotally attached at one end to beam 158 and at the other end to respective arms 164. Arms 164 are secured to a front shaft 166 which is mounted to frame 20 at each end by suitable bushings 166a. A follower arm 168 is secured to shaft 166 for rotating shaft 166 by following a groove in a cam H. A plurality of gripper members 170 are spaced equally along beam 158. The on-center spacing of gripper 170 is the same as the spacing of grooves 146a and is also the same as the spacing of the aligned working stations 34, 36, 38, 40 and 42. This spacing is also the same as the on-center spacing between the cutting and forming stations 28 and 30 and the swaging station 34.

In general operation, the grippers 170 receive the wire segments W' from the transfer system by gripping the segments by their bent ends formed at station 30. The carrier system, including grippers 170, will then carry the segments W' forward into the stations 34, 36, 38, 40 and 42 as workpieces. The carrier system will then return. The transfer bar 126 has moved to the left as viewed in FIGURE 1 and receives the segments W' from stations 28 and 30 and from each of grippers 170. The transfer bar 126 then moves to the right, and the grippers 170 receive the wire segments W' from the transfer system to complete a cycle. In the next cycle, the carrier system proceeds toward the working stations 34, 36, 38, 40 and 42, permits working on the wire W', and returns to release the workpiece to the transfer bar for transfer to the gripper 170 aligned with the next subsequent station.

The grippers 170 are more particularly shown in FIGURE 1. Each gripper 170 includes a shaft 172 which is slidably mounted through a bushing 174 in a leg of angle beam 158. The shafts 172 are axially adjustable in bushing 174 for handling various wire lengths, and set screws 176 are provided to secure the shafts 172 in proper axial disposition. A head 178 is carried by each shaft 172, and each head 178 is provided with a stationary jaw 180 as an insert in the free end thereof. A movable jaw 182 is secured to an arm 184, disposed within a slot in head 178 pivoted at 186 for cooperation with jaw 180. A compression spring 187 is provided between head 178 and arm 184 to maintain jaw 182 normally in gripping association with jaw 180.

For opening the gripper 170, an actuator in the form of a crank 188 is pivotally mounted at 190 to frame 20, below beam 158. One arm of crank 188 is disposed to engage arm 184, and the other arm of crank 188 is pivotally connected to a rod 192. Each rod 192 is secured at its lower end to a common bar 194 which is supported by a follower rod 196 from a groove in cam J. Bar 194 is free to slide upward and downward in suitable brackets on frame 20. Each time rod 196 is forced upward by a rise on cam J, the cranks 188 are pivoted clockwise as viewed in FIGURE 4, pivoting arm 184 to open jaw 182 from jaw 180.

It will be noted that the gripping surfaces of jaws 180 and 182 are generally vertical and hold the bend formed in the end of wire segment W' in a generally vertical disposition, thereby maintaining the same orientation of wire segment W' as the wire is carried as a workpiece toward and away from each of the working stations.

Figure 6:
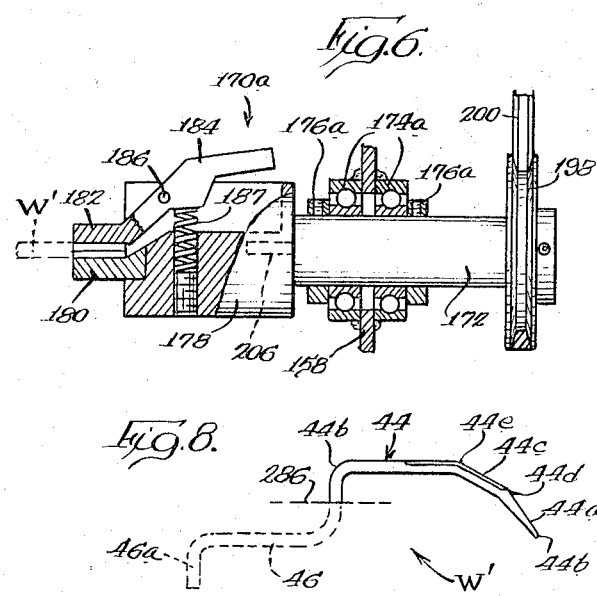
FIGURE 6 is an enlarged view of a gripper assembly with portions cut-away to show internal structure.

The gripper on beam 158 which is aligned with the grinding station 36 differs from the remaining grippers 170 in that the gripper is rotated to rotate the wire workpiece on the axis of the wire workpiece. This gripper is identified as gripper 170a and is more particularly shown in FIGURE 6. The shaft 172 of gripper 170a is rotatably mounted through the leg of beam 158 by suitable bearings 174a and has a pulley 198 secured thereto, driven through a belt 200 from a pulley 202 secured to shaft 60. A pair of sleeves 176a are releasably secured against axial movement on shaft 172. Sleeves 176a may be released on shaft 172 axially sliding through bearings 174a for adjusting the gripper to receive various sizes of wire.

The head 178 of gripper 170a is held against rotation by a stop 204 (FIGURE 4) mounted to frame 20, received in a stop receiver 206 on head 178. As beam 158 is moved toward the array of work stations, stop 204 does not move and is removed from receiver 206. Belt 200, which is loose-fit on pulleys 198 and 202, slips while stop 204 is in receiver 206 but is permitted to rotate shaft 172 as the gripper 170a is carried toward grinding station 36.

Each of the aligned stations 34, 36, 38, 40 and 42 includes an entry position identified by reference numeral 208 in alignment with the respective grippers 170 servicing the stations.

Referring to FIGURES 1-3, the swaging station is a commercial swaging device. In operation, the free end of a wire is introduced at entry 208; and a plurality of dies, shown schematically at 210, are driven by a shaft 212 to pound or swage the wire end to a taper. The dies need not be sufficient to provide a sharp point on the end of a wire, a blunt point being fully sufficient for the purposes herein. Shaft 212 has mounted thereon a pulley 214 driven by a belt 216 from shaft 60.

The grinding station 36 includes a grinding wheel 218 with the axis thereof below the entry position 208. Grinding wheel 218 presents its treated or peripheral grinding surface to the workpiece end when the workpiece is moved into contact therewith through entry position 208. Wheel 218 is mounted on a shaft 220 having a pulley 222 driven by belt 224 from a rear shaft 226. Rear shaft 226 is in turn driven by a belt 228 from shaft 60. As has been seen, as the end of the wire is presented to grinding wheel 218, above the axis thereof, and wheel 218 is rotated, the gripper 170a is also rotated to form a ball end or point on the workpiece. When the gripper 170a is returned and stopped, it is stopped with the bent end portion of the wire segment W' again in vertical disposition. Also, arm 184, which rotates with the gripper, is disposed in position to be properly engaged by crank 188 for opening the gripper jaws.

The punching or grooving station 38 includes a suitable frame 230 mounted on frame 20 with a plunger die 232 vertically slidable therein. The plunger die 232 is provided with a sharp edge on the lower end thereof for punching or stamping an elongated groove in the wire segment W' when the wire segment is positioned through the entry station 208 and supported by a wire support groove 234 in a base portion of frame 230. Impaling the upper end of plunger die 232 is a crank shaft 236 supporting die 232 for raising and lowering the die as crank shaft 236 is turned. A flywheel 238 freely rotates on shaft 236 and is driven by a belt 239 from rear shaft 226 so that flywheel 238 is constantly rotating. A one-revolution clutch 240 is provided on shaft 236 for engaging shaft 236 with flywheel 238 for one revolution each time the clutch actuating arm 244 is pivoted clockwise as viewed in FIGURE 3. At the beginning of each one revolution, die 232 is in its raised position, and during the revolution the die is driven downward for grooving the wire supported in groove 234, and the die is then moved to its raised position to complete the one revolution. Actuating arm 242 is pivotally mounted at 244 to frame 20 and carries an impact lug 142 at its lower end disposed to be struck by a lug 144 on a cam K once during each revolution of cam K to engage the one-revolution clutch 240 and cause the stamping or grooving operation.

Figure 5:
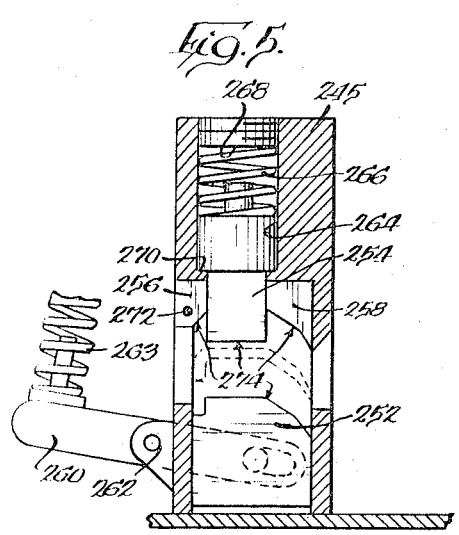
FIGURE 5 is an enlarged section through a bending device at a bender at a bending station in the device of FIGURE 1.

Bending station 40 is best seen in FIGURES 3 and 5. At bending station 40, a suitable frame 245 is provided secured to and supported by frame 20. The bending system is also driven by flywheel 238 through one-revolution clutch 240; accordingly, a disc or wheel 246 is mounted on shaft 236 and carries a pin 248 on which an arm 250 is pivotally mounted. At the beginning of each revolution of shaft 236, wheel 246 is disposed with pin 248 at the top thereof.

The bending station includes a plurality of dies 252, 254, 256 and 258. Die 252 is the driven die and is pivotally mounted on one end of an arm 260 which is in turn pivotally mounted to frame 245 to pivot pin 262. A strong resilient link in the form of compression spring 263 connects the other end of arm 260 to arm 250. Die 254 includes an upper piston-like shank received in a cylinder 264 in frame 245 and is normally biased downward by a spring 266. Die 254 is, therefore, vertically slidable, and the upward travel of die 254 is limited by a stop surface 268, and the downward travel is limited by a stop surface 270. Die 256 is pivotally mounted to frame 245 by pin 272. Die 258 is secured to frame 245 against movement. The forming surfaces of the two dies are identified at 274.

In operation, during each cycle, each time one-revolution clutch 240 is tripped, wheel 246 rotates carrying pin 248 downward urging die 252 upward through the compression spring 263. The workpiece has been positioned at the entry position 208 and, as die 252 travels upward, it engages the workpiece, drives it against die 254 carrying 254 upward while compressing spring 266. Die 256 pivots on pin 272, presenting its surface 274 against the wire segment W' opposing a portion of the surface 274 of die 252. Dies 252 and 254 continue upward, and the wire segment W' engages and is bent by die 258. At the upper limit of travel of die 254, the wire segment W' is bent to conform between the surface 274 of die 252 and the surfaces 274 of dies 254, 256 and 258. Wheel 246 continues for the second half of its revolution and returns die 252. Dies 254 and 256 also return. The wire segment W', now having looping point configuration, is withdrawn from the bending station for transfer to the cutting zone 42.

The cutting station (see FIGURES 1 and 3) includes a frame 276 secured to and supported by frame 20. A horizontal blade 278 is mounted on frame 276 against movement. A movable blade 280 is mounted on the upper end of an arm 282 which is pivoted at 284 and carries an impact lug 142 in position to be struck by rise or lug 144 on a cam L. Lug 144 on cam L strikes the lug 142 on arm 282 once each revolution to pivot blade 280 into cutting cooperation with blade 278 to cut the looping point 44 from the remainder 46 of the wire segment W' (see FIGURE 8) in a generally horizontal plane as shown in phantom at 286. The looping point 44 falls to a product receiver 300. The beam 158 returns to release the workpieces to holders on transfer bar 126. However, there is no holder to receive the waste piece 46, and the waste piece 46 falls to a waste receiver 302 therebelow.

Figure 7:
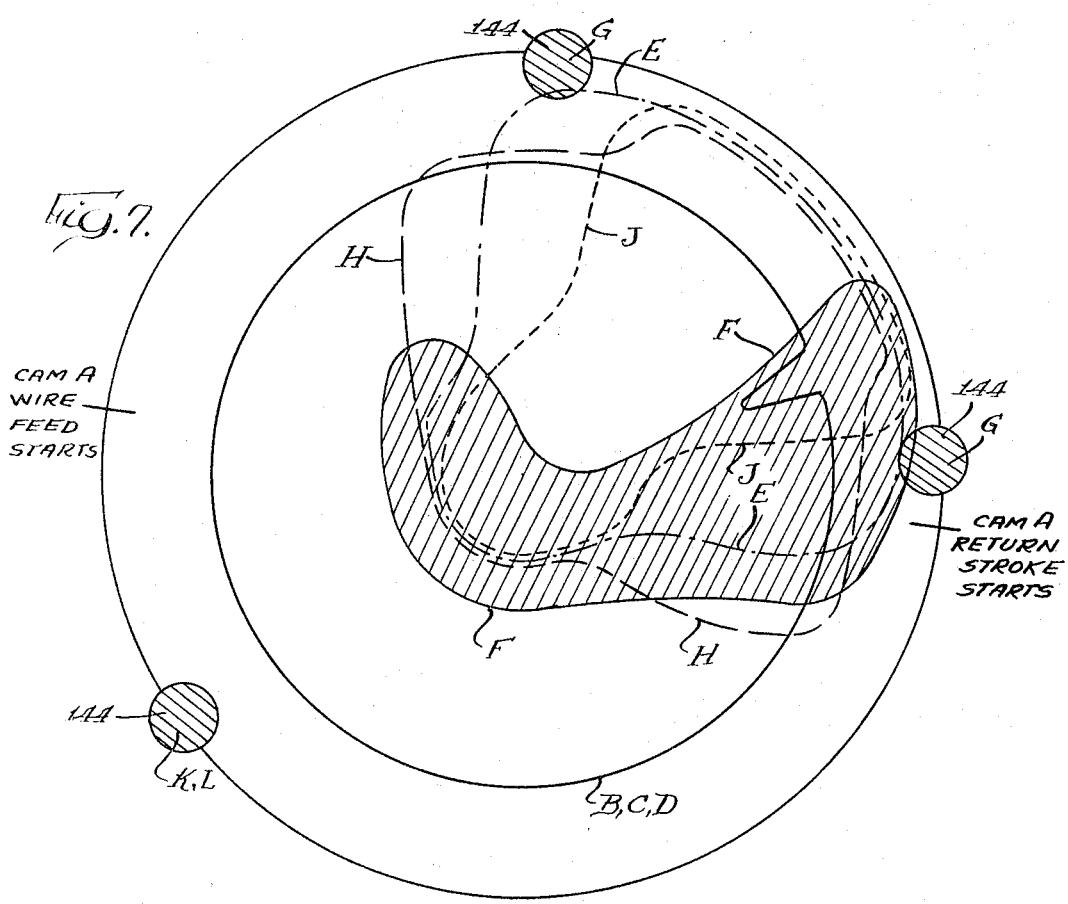
FIGURE 7 is a diagrammatic illustration of cam configuration which may be viewed as a timing chart for the device of FIGURE 1.

The over-all operation of the device may best be understood with reference to the diagrammatic illustration of cams A–L shown in FIGURE 7. This illustration may be considered as a timing chart. As indicated above, the operation of the device is cyclic; and during each cycle an operation is performed at one of six stations, the first station constituting the composite straightening, cutting and bending stations. The second in six stations are the aligned stations 34, 36, 38, 40 and 42.

Considering the chart of cams, the cams B, C, D, E, H and J include cam slots in a side face thereof configurated generally in accordance with the respective lines identified therefor in FIGURE 7. Cam A has been described above, cams B, C and D are of generally identical configuration, and cams G, K and L carry lugs 144 for striking impact lugs 142 as described above, with the lugs 144 spaced generally as indicated in FIGURE 7. Cam F includes a solid lug on one side face within the general area outlined in FIGURE 7 for camming its appropriate impact lug 142 to shift the transfer bar 126 to the left as the lug 142 proceeds from a low to a high and to shift the transfer bar 126 to the right as the lug proceeds from a high to a low, transfer bar 126 being spring-urged by a tension spring 127 toward its rightward position.

Considering the position X as the beginning of a cycle, the wire feed stroke has just been completed and the return stroke is beginning. Cam G closes the transfer bar holders, and cam J releases the carrier bar grippers. The carrier bar moves rearward from its position in which it has released the wire segments to the transfer bar holders, the rearward movement being a matter of a few inches to permit the transfer bar to move without interference from the carrier bar grippers. The clamping, cutting and bending operations are continued by cams B, C and D to provide a new wire segment W', and the wire segment is released by all devices except the transfer bar holders. The transfer bar 126 is shifted to the right by cam F to advance each wire segment W' into alignment with the next subsequent station. Cam H moves carrier beam or bar 158 forward, and the grippers 170 and 170a are in position and open to grip the bent wire segment ends. Cam J closes all grippers, and cam G unlocks the transfer bar holders. The transfer bar is dropped by cam E to a position below and clearing the carrier bar so that the carrier bar may proceed thereover without interference. The carrier bar or beam 158 is moved forward by cam H to a position disposing the ends of the wires W' in the respective entry position 208 of zones 34, 36, 38, 40 and 42. Cam F then shifts the transfer bar to the left. The wire feed system has reached the end of the return stroke and starts the wire feed stroke to feed another length of wire into the wire length cutting system. The lugs or rises 144 on cams K and L strike the appropriate impact lugs 142 for effecting the punching or grooving, bending and cutting operations at stations 38, 40 and 42. The carrier frame 158 is returned by cam H to its position for releasing the wire segments W' to the transfer bar holders. The transfer bar 126 is elevated by cam E, and the wires are received in grooves 146a. The wire feed stroke of cam A is complete, and a new length of wire is in position for cutting and bending as the transfer bar holders are closed by cam G. It will be seen that repetition of the cycle will provide continuous feeding of wire, preparation of wire segments and processing of the wire segments to provide the desired looping points.

I claim:

1. A system for making looping points for use in looping machinery, which system comprises a wire receiver including means for cutting the wire to size, means forming an orienting bend at the end of each cut wire segment, swaging means at a swaging station for shaping the end of a piece of wire to a blunt point, grinding means at a grinding station for grinding a rounded end on the blunt point, punch means at a grooving station for punching a groove lengthwise in the wire, bending means at a bending station for bending the wire to looping point shape and cutting means at a cutting station for cutting the looping point shape from the remainder of the wire, and means for transferring said wire from said forming means to said swaging, grinding, punching, bending and cutting stations while maintaining said wire properly aligned during working at each of said stations by orienting said wire relative to said bend.

2. In a device for the manufacture of an article from wire in which the wire is fed and cut to length and held by one end as a workpiece for working on another position of the wire at a plurality of work stations, the improvement which comprises means for bending a grippable bend in the non-work portion of the wire as it is fed to the device and cut to length and gripper means for holding the wire by the grippable bend for presenting said other portion of the wire to a plurality of work stations with the fomed bend as a reference for proper disposition of the wire.

3. A system for making looping points for use in looping machinery which system comprises stamping means for stamping a longitudinal groove spaced from a pointed end of a pointed wire workpiece, die means for bending the wire workpiece to looping point shape and cutting means for cutting the looping point shape from the remainder of the workpiece, and means for transferring the workpiece between said stamping, bending and cutting means.

4. A system for forming a looping point configuration in a properly pointed wire workpiece, which system comprises stamping means having an entry position for receiving the workpiece and including a stamping plunger driveable into engagement with the received workpiece and return, bending means separate from said stamping means having a separate entry position for receiving a stamped workpiece and bending die means driveable into engagement with the workpiece and return, flywheel means, means for continuously rotating said flywheel means, a common rotatable member connected to said plunger and die means for driving said plunger and die means into engagement with the workpiece and return during each revolution thereof, strong resilient means in the connection of said rotatable member to said die means for protecting said die means from damage, and one revolution clutch means for engaging said rotatable member with said flywheel means to drive said driven member through one revolution on each engagement by said clutch means, whereby both said plunger and die means are operated simultaneously for simultaneously processing a plurality of workpieces in different degrees of completeness.

5. A system for bending a wire to looping point configuration including a frame having a wire entry position, a first die having a first forming face, said first die being slidably mounted for movement away from said position to a stamping limit, first resilient means urging said first die toward said position, a second die mounted to said frame adjacent said first die and having a second forming face disposed contiguous with said first forming face with said first die at said stamping limit, a third die pivotally mounted to said frame adjacent said first die for movement between storage and forming positions, said third die in forming position presenting a third forming face contiguous with said first forming face, a fourth die slidably mounted on the opposite side of said entry position for movement from a storage position transversely through said entry position to a forming position while driving a wire at said entry position against said first three dies to move said first die to said stamping limit and pivoting said third die to forming position, said fourth die having a forming face cooperating with the forming faces of said first three dies for bending the wire to looping point configuration as said first die reaches limiting position and said fourth die reaches forming position, and resilient force-transmitting means for driving said fourth die to forming position.

6. A system for bending a wire to looping point configuration including a frame having a wire entry position, a plurality of dies having forming faces, means separately mounting each of said dies and mounting at least a first of said dies for movement between a normal wire receiving position and a wire bending position, a separate driving die, means mounting said driving die for movement from the opposite side of said entry position transversely through said entry position to a bending position while driving a wire at said entry position against said first plurality of dies to move said first die from wire receiving position to wire bending position, said driving die having a forming surface cooperating with the forming surfaces of said plurality of dies for bending the wire to looping point configuration with said first and driving dies in bending position, and resilient force-transmitting means for sharply moving said driving die to bending position.

7. A system for forming a looping point shape in a wire workpiece, which system comprises bending means having a work position for receiving the workpiece and including a bending die means aligned with and driveable into engagement with the received workpiece and return, holder means for holding the workpiece, means movably mounting said holder means for moving the workpiece between a retracted position and said work position, flywheel means, means for continuously rotating said flywheel means, a rotatable member, compressing spring means connecting said rotatable member for driving said die means into engagement with the workpiece and return during each revolution thereof, one revolution clutch means for engaging said rotatable member with said flywheel means to drive said driven member through one revolution on each engagement by said clutch means, and control means for sequentially operating said holder means to move the workpiece to work position and operating said clutch, whereby said die bends said workpiece to looping point shape.

8. A system for making looping points for use in looping machinery, which system comprises a frame, wire straightener means defining a wire entry position on said frame, wire holding means for receiving wire from said straightener means, means for cutting wire to predetermined length while held in said holding means, impact means for bending the entry end of the wire while in said holding station at an angle of about 90°, means defining a swaging station for shaping the unbent end of the predetermined length of wire to a blunt point, means defining a grinding station for grinding a hemispherical end on said blunt point, means defining a punching station for punching a groove lengthwise in said wire, means defining a bending station for bending said wire to the configuration of a looping point with said groove on the outer curve thereof, means defining a cutting station for cutting the bent looping point from the remainder of the wire length, and means for transferring said wire from said holding station to each of said swaging, grinding, punching, bending and cutting stations seriatim.

9. The system of claim 8 wherein each of said wire holding, swaging, grinding, punching, bending and cutting stations has a wire entry position spaced an equal distance on center from each other and said transferring means comprises transfer bar means movable between raised and lowered positions and movable reciprocally between pickup and release transfer positions spaced said equal distance and aligned with respective ones of said entry positions, a plurality of holder means spaced said equal distance along said transfer bar for alignment with the entry positions of adjacent ones of said stations with said transfer bar in respective ones of said transfer positions, carrier bar means movable between a storage position removed from said stations and a working position adjacent said stations, a separate gripper on said carrier bar in alignment with the entry position at each of said stations, means for moving said transfer bar between raised and lowered positions, means for moving said transfer bar between said transfer positions, means for moving said carrier bar between said working and storage positions, means for dwelling said carrier bar in a transfer position with said transfer bar in raised position during movement of said carrier bar in each direction between said storage and working positions, means for releasing said grippers and closing said holders at the transfer position during travel of the carrier bar from working to storage position to release the workpiece from said grippers and clamp the workpiece in said holders and means for moving the grippers to gripping position and the holders to unclamped position during the dwell at said transfer station in the travel of said carrier bar from storage to work position to transfer said workpieces from said holder means to said gripper means, whereby said carrier bar carries the workpieces to said aligned stations for work and removes the workpiece from said aligned stations and said transfer bar receives the workpieces from each of said grippers and moves the workpiece to the next adjacent gripper for carrying said workpiece into the next adjacent aligned station.

10. A system for making looping points for use in looping machinery, which system comprises means for measuring wire and cutting segments thereof to predetermined lengths, hammer means forming an orienting bend at the end of each wire segment, a plurality of working means defining aligned working stations including swaging means defining a swaging station for shaping the unbent end of a cut wire segment to a blunt point, grinding means defining a grinding station for grinding a rounded end on the blunt point, die means defining a punching station for punching a groove lengthwise in the wire, die means defining a bending station for bending the wire to looping point configuration and blade means defining a cutting station for cutting the looping point from the remainder of the wire, means adjustable for handling a plurality of different length wire segments for transferring said wire segments seriatim to said swaging, grinding, punching, bending and cutting stations while maintaining said wire properly aligned during working at each of said stations by orienting said wire relative to said bend, and cam means for timing the measuring and cutting means, the hammer means, each of said die means, and said blade means for working in timed relation with said transferring means.

11. A system for making looping points for use in looping machinery, which system comprises a frame; wire straightener means defining a wire entry position on said frame; wire holding means for receiving wire from said straightener means; means for cutting wire to predetermined length while held in said holding means; impact means for bending the entry end of the wire while in said holding station at an angle of about 90°; means defining a swaging station for shaping the unbent end of the predetermined length of wire to a blunt point; means defining a grinding station including means for griding a hemispherical end on said blunt point, said grinding means comprising a grinding member having a grinding surface, and means for moving said grinding means to move said surface past a work position; means defining a punching station for punching a groove lengthwise in said wire; means defining a bending station for bending said wire to the configuration of a looping point with said groove on the outer curve thereof, said bending means including: means on said frame defining a wire entry position, a first die having a first forming face, said position slidably mounted for movement away from said position to a stamping limit, first resilient means urging said first die toward said position, a second die mounted to said frame adjacent said first die and having a second forming face disposed contiguous with said first forming face with said first die at said stamping limit, a third die pivotally mounted to said frame adjacent said first die for movement between storage and forming positions, said third die in forming position presenting a third forming face contiguous with said first forming face, a fourth die slidably mounted on the opposite side of said entry position for movement from a storage position transversely through said entry position to a forming position while driving a wire at said entry position against said first three dies to move said first die to said stamping limit and pivoting said third die to forming position, said fourth die having a forming face cooperating with the forming faces of said first three dies for bending the wire to looping point configuration as said first die reaches limiting position and said fourth die reaches forming position, flywheel means, means for continuously rotating said flywheel means, a rotatable member, compressing spring means connecting said rotatable member for driving said fourth die into engagement with the workpiece and return during each revolution thereof, and one-revolution clutch means for engaging said rotatable member with said flywheel means to drive said driven member through one revolution on each engagement by said clutch means; means defining a cutting station for cutting the bent looping point from the remainder of the wire length including means for cutting a looping point formed from a length of wire from the remainder of said length of wire, which comprises a first blade mounted horizontally against movement, a second blade having an edge facing the edge of the first blade and slidable toward and away from said first blade for providing a gap therebetween and for cutting respectively, a driven shaft, cam means mounted on said shaft for rotation therewith and including a cam lug, an arm attached to said second blade and carrying an impact member disposed to be struck by said cam lug for moving said second blade into cutting cooperation with said first blade from the gap providing position to the cutting position, pivot means mounting said arm spaced from said blade, a cam impact member on said arm spaced from said pivot means, and means for holding a workpiece with the portion to be cut extending upright within the gap between said blades and adjacent said first blade, whereby upon hitting said impact member by said cam lug said second blade moves sharply to cutting position to cut said workpiece; and means for transferring said wire from said holding station to each of said swaging, grinding, punching, bending and cutting stations seriatim, said transferring means including a holder for presenting the workpiece to said grinding surface at an angle thereto for grinding a round shape on the workpiece, which holder comprises a movable frame mounted for movement toward and away from the grinding surface, between a work position and a retracted position, a head, means mounting said head on said movable frame for rotation, means for rotating said head, jaw means movable between gripping and releasing positions on said head for holding the workpiece while in gripping position and for disposing the workpiece against said surface with said frame in work position, means carried by said head for moving said jaw means, means independent of said head for engaging said jaw moving means to move said jaw with said movable frame in retracted position and said head in a predetermined rotational position, means overriding said rotating means and stopping said head in said rotational position responsive to movement of said movable frame to retracted position, and control means for sequentially operating said holder means to move the workpiece to each work position and operating said one-revolution clutch, whereby said fourth die at said bending station bends said workpiece to looping point shape.

12. A system for forming looping points which comprises means for forming a point on a length of wire, means for stamping a longitudinal groove in the wire, means for bending a portion of the wire to looping point configuration including forming a bend within the length of the groove, means for cutting the looping point configuration from the remainder of the wire, and means for holding the wire in predetermined orientation during said stamping, bending and cutting.

13. A system for forming looping points which comprises means for cutting a length of wire, means for stamping a longitudinal groove in the cut length of wire, means for bending the stamped and cut length of wire to looping point configuration, and means for transferring said cut length of wire from said stamping means to said bending means and presenting the wire to said bending means in predetermined orientation relative to its orientation at said stamping means.

14. The device of claim 2 including means for cutting the grippable bend from the article after passing the wire to each of the work stations.

15. The device of claim 2 including at one of said work stations a system for grinding a point on the end of the wire which comprises grinding means defining a grinding surface and means for moving said grinding means to move said surface past a work position, said gripper means comprising means for holding the wire with an end thereof disposed against said surface at said work position, and including means for reciprocally moving said holding means between said work position and a retracted position with said end removed from said surface, means for rotating said holding means while at said work position, means blocking said holding means from rotation while in said retracted position, and means for transferring the wire to and from said holding means with said holding means blocked against rotation in said retracted position.

16. The system of claim 15 wherein said blocking means comprises abutment means for blocking said holding means against rotation in a predetermined angular position responsive to each movement of said holding means to the retracted position.

17. The device of claim 2 including means for cutting a length of wire sufficient to form the article prior to bending by said bending means.

References Cited by the Examiner
UNITED STATES PATENTS

| | | | |
|---|---|---|---|
| 1,958,442 | 5/1934 | Pechy | 72—405 |
| 2,102,467 | 12/1937 | Ljungstrom | 140—1 |
| 2,497,297 | 2/1950 | Court | 140—71 |
| 2,517,436 | 8/1950 | Jones | 140—71 |
| 2,903,895 | 9/1959 | Larsen | 83—602 |
| 2,958,167 | 11/1960 | Mueller | 51—232 |

CHARLES W. LANHAM, *Primary Examiner.*

LOWELL A. LARSON, *Assistant Examiner.*